United States Patent
Keohane et al.

(10) Patent No.: US 7,512,659 B2
(45) Date of Patent: Mar. 31, 2009

(54) ENABLING INTERACTIVE ELECTRONIC MAIL AND REAL-TIME MESSAGING

(75) Inventors: Susann Marie Keohane, Austin, TX (US); Gerald Francis McBrearty, Austin, TX (US); Shawn Patrick Mullen, Buda, TX (US); Jessica Murillo, Hutto, TX (US); Johnny Meng-Han Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 817 days.

(21) Appl. No.: 11/014,068

(22) Filed: Dec. 16, 2004

(65) Prior Publication Data

US 2006/0168026 A1  Jul. 27, 2006

(51) Int. Cl.
*G06F 15/16* (2006.01)
(52) U.S. Cl. .................................. 709/206
(58) Field of Classification Search ................ 709/206
See application file for complete search history.

(56) References Cited

U.S. PATENT DOCUMENTS

| | | | |
|---|---|---|---|
| 6,501,834 B1 * | 12/2002 | Milewski et al. | 379/93.24 |
| 2001/0003202 A1 * | 6/2001 | Mache et al. | 713/153 |
| 2002/0065887 A1 * | 5/2002 | Paik et al. | 709/205 |
| 2003/0018718 A1 * | 1/2003 | Maehiro | 709/205 |
| 2004/0054736 A1 * | 3/2004 | Daniell et al. | 709/206 |
| 2004/0078448 A1 * | 4/2004 | Malik et al. | 709/206 |
| 2004/0128356 A1 * | 7/2004 | Bernstein et al. | 709/206 |
| 2004/0158610 A1 * | 8/2004 | Davis et al. | 709/206 |
| 2004/0186896 A1 * | 9/2004 | Daniell et al. | 709/207 |
| 2004/0215721 A1 * | 10/2004 | Szeto et al. | 709/204 |
| 2005/0027779 A1 * | 2/2005 | Schinner | 709/200 |
| 2005/0030937 A1 * | 2/2005 | Wick et al. | 370/352 |

FOREIGN PATENT DOCUMENTS

WO  WO 2004/044782 A1  5/2004

OTHER PUBLICATIONS

Kelley, et al., "Method, System and Storage Medium for Providing Interoperability of Email and Instant Messaging Services", U.S. Appl. No. 10/605,572, filed Oct. 9, 2003.

* cited by examiner

*Primary Examiner*—John Follansbee
*Assistant Examiner*—Saket K Daftuar
(74) *Attorney, Agent, or Firm*—Dillon & Yudell LLP (57) ABSTRACT

A system, method, and computer program product for managing e-mail and real-time messaging activity between a first client and a second client. In accordance with one embodiment, the method includes the first or second client detecting an $n^{th}$ e-mail thread response to an original e-mail message delivered between the first client and second client, wherein n is greater than or equal to one. In response to detecting occurrence of an $n^{th}$ e-mail thread response, a real-time electronic messaging session is invoked between the first and second clients. In an alternate embodiment of the invention, the first client sends a real-time message to the second client during a real-time messaging session between the first and second clients. In response to a specified real-time messaging session termination event, an e-mail message containing the sent real-time message is sent to the second client.

17 Claims, 5 Drawing Sheets

ENABLING INTERACTIVE ELECTRONIC MAIL AND REAL-TIME MESSAGING

BACKGROUND OF THE INVENTION

1. Technical Field

The present invention relates generally to electronic messaging and in particular to mechanisms and techniques for combining e-mail and real-time messaging functions. More particularly, the present invention relates to a method, system, and computer program product that enable e-mail and instant messaging applications to cooperatively interact in accordance with correspondence and client parameters.

2. Description of the Related Art

The many forms of electronic messaging (e-mail, voice mail, instant messaging, etc.) have undergone a dramatic surge in development and use in many personal and almost all institutional communications systems. Such electronic messaging systems simplify the task of communication by automating delivery and storage of messages. A prominent characteristic shared by such systems, including e-mail and instant messaging, is the enablement of relatively free-form user communications. That is, although the control/header information is necessarily standardized and structured, the body portion of the respective messages remains relatively unstructured and determined in accordance with user style and preference. A major distinction between such systems is the distinction between stored-message electronic correspondence such as e-mail, voice mail, etc., and real-time messaging such as provided by instant messaging, Internet Relay Chat (IRC), ICQ (I seek you), voice-over Internet protocol (VoIP), etc.

An electronic message recipient (person) is faced with a choice of media to use to respond to any given electronic message. The recipient may, for example, respond by e-mail as a default if the original message was received by email. Similarly, a voice call may be considered the most appropriate response to a received voice mail message.

Many improvements in e-mail technology relate to enhancing conversational communications using address option and formulation tools to increase the efficiency of e-mail drafting and delivery. This is particularly true in the case of the e-mail thread, which is essentially an e-mail "conversation" occurring among two or more e-mail client stations. For example, when an e-mail message is received by a recipient networked computer, well-known e-mail client tools enable the recipient to strategically utilize portions of the content of the received message to respond in some manner. Typical of such options are a "reply to sender" option, a "reply to all" option, a "forward" option, etc. One advantageous feature of such e-mail functions is shared by the "reply" options which provide the message recipient with a convenient reply graphical user interface (GUI) in which some or all of the e-mail address content included in the received message is conveniently pre-loaded into the "send to" address field, thus relieving the recipient/replier from having to manually enter the address information.

While e-mail "reply" and similar functions facilitate electronic messaging conversations, there may be occasions where a more "real-time" media choice would be preferred in communicating between the sender and the recipient.

Along the with development of substantially non-real-time correspondence provided by e-mail, several real-time electronic messaging tools, such as instant messaging have undergone dramatic development. Instant messaging is becoming a very popular form of communication for both personal and business use. Many corporations are encouraging employee instant messaging use by integrating this feature into users' desktops. In contrast with e-mail, instant messaging is an effective tool for quick and concise communication to limited subject matter when the user requires a substantially real-time response.

Conversely to the problems encountered when using e-mail in a rapid correspondence manner, real-time electronic messaging tools such as instant messaging, rely on substantially constant and uninterrupted user attentiveness to provide the desired conversational effect. Instant messaging (IM), for example, employs so-called "presence" data that is used by an instant messaging client to set his/her present instant messaging accessibility/activity status. IM software allows a user to set his/her status as "active," "inactive," and "do not disturb." IM users receive various types of communication based on their presence status. For example, "active" users can be requested to join an IM chat session, "inactive" users can receive a single IM message from a given sender, and "do not disturb" users cannot receive any messages from other users. IM software relies on the individual user to change their status (inactive→active) or after a certain period of inactivity user status is automatically changed (active→inactive).

Based on workload, IM message receivers may not change their status frequently or do not pay attention to sametime messages in a timely manner. If the IM message receiver is not responding and the IM message sender has to terminate the IM session, there is a possibility that the sender will not receive confirmation that the receiver (person) read the message and further communications on the topic will be lost.

It would therefore be useful to provide a system and method for enabling greater interactivity between mail-type correspondence and real-time electronic messaging forums such as between e-mail and instant messaging. There is a further need to provide real-time messaging users the ability to automatically send an e-mail message with the IM message contents to the receiver in the event the IM message receiver does not respond within a specified period of time. The present invention addresses these and other needs unresolved by the prior art.

SUMMARY OF THE INVENTION

A system, method, and computer program product for managing e-mail and real-time messaging activity between a first client and a second client are disclosed herein. In accordance with one embodiment, the method includes the first or second client detecting an $n^{th}$ e-mail thread response to an original e-mail message delivered between the first client and second client, wherein n is greater than or equal to one. In response to detecting occurrence of an $n^{th}$ e-mail thread response, a real-time electronic messaging session is invoked between the first and second clients. In an alternate embodiment of the invention, the first client sends a real-time message to the second client during a real-time messaging session between the first and second clients. In response to a specified real-time messaging session termination event, an e-mail message containing the sent real-time message is sent to an electronic mailbox where it is retrievable by the e-mail client.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT(S)

Reference is now made to the description of the embodiments illustrated in the figures. It should be noted that while several embodiments are described with reference to the figures, the present invention is not limited to the specific limitations depicted therein. Additionally, while the following description and corresponding figures depict specific embodiments that provide cooperative functioning of e-mail and instant messaging (IM), it will be apparent to one of ordinary skill in the art that the inventive systems and methods presented herein are also applicable to combining other "real-time" communications or messaging systems such as Internet Relay Chat (IRC), ICQ (I seek you), voice-over Internet protocol (VoIP), etc. with an e-mail application in an analogous manner.

The present invention is generally directed to a method, system and computer program product for managing e-mail and real-time messaging activity between e-mail and real-time messaging clients. More specifically, the present invention is directed to utilizing client and messaging status to seamlessly transition from stored-correspondence type messaging such as e-mail thread correspondence to a real-time messaging correspondence such as instant messaging (IM). Alternate embodiments of the invention are directed to leveraging the stored-correspondence aspects of e-mail to address problems relating to the inherent unreliability arising from automatic IM session termination or lack of IM user attentiveness. As explained in further detail with reference to the figures, the present invention may be practiced as a computer-implemented processing method, a program product and/or a data processing system adapted to implement/execute the same.

The invention may be practiced in distributed computing environments where tasks are performed by remote processing devices that are linked through a communications network. In a distributed computing environment, program modules may be located in both local and remote memory storage devices. Execution of the program modules may occur locally in a stand-alone manner or remotely in a client/server manner. Examples of such distributed computing environments include local area networks of an office, enterprise-wide computer networks, and the Internet. In a distributed computing environment, program modules may be located in both local and remote memory storage devices.

Figure 1:
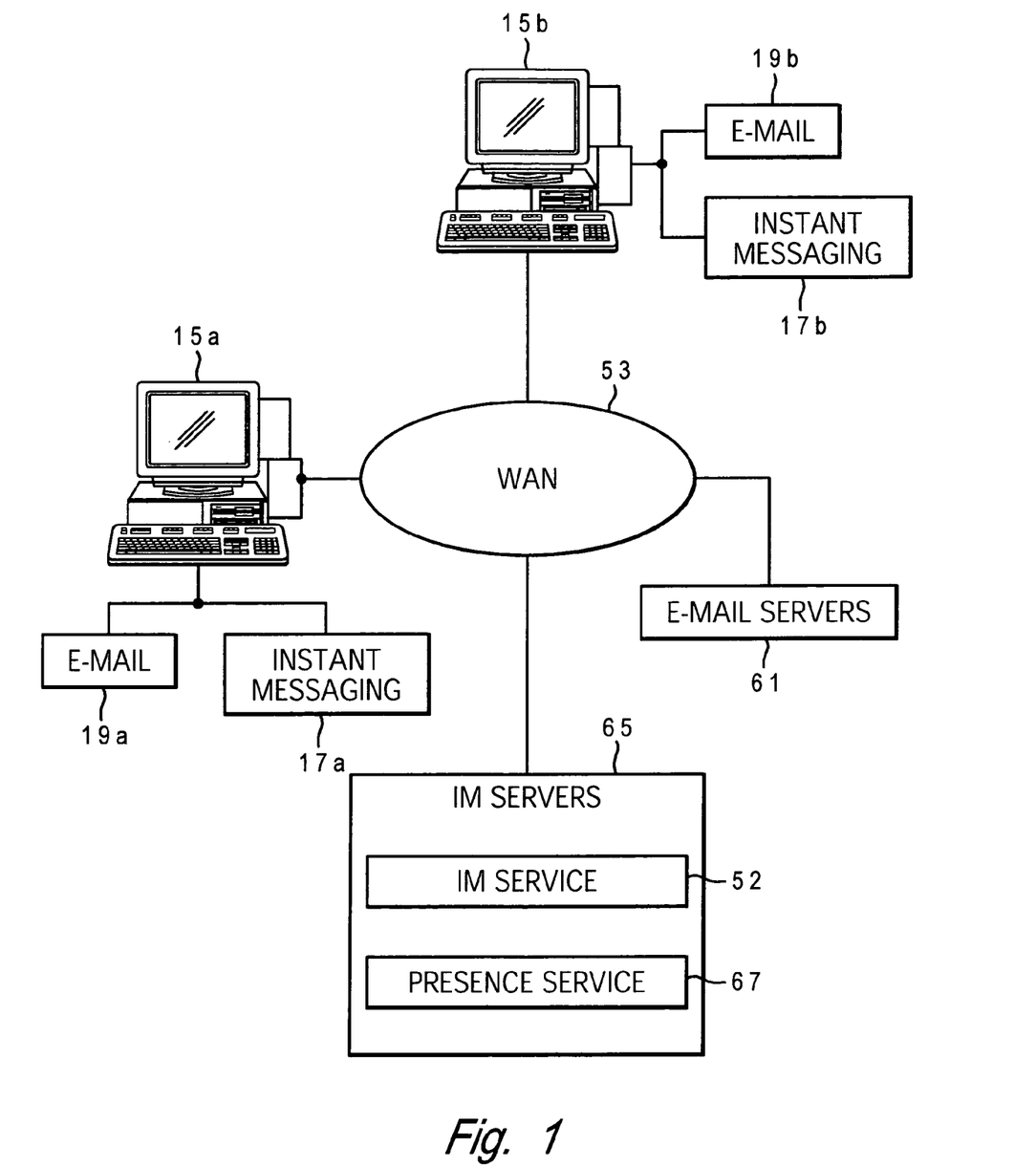
FIG. 1 illustrates a simplified diagram of network components adapted for managing e-mail and real-time messaging activity between clients in accordance with the present invention.

With reference now to the figures, wherein like reference numerals refer to like and corresponding parts throughout, and in particular with reference to FIG. 1, there is illustrated a simplified diagram of network components adapted for managing e-mail and real-time messaging activity between clients in accordance with the present invention. The depicted network system includes client systems 15a and 15b communicatively coupled via a wide area network (WAN) 53, which in one embodiment may be the Internet. As related to the inventive concepts disclosed herein, client systems 15a and 15b include respective e-mail and IM clients for exchange messages as described in further detail below.

In a preferred embodiment in which WAN 53 is the Internet, client systems 15a and 15b may be general-purpose desktop computers that subscribe to Internet service providers and further include operating system software, an e-mail client application 19a-19b, an IM client application 17a-17b, and other programs stored and executed on client systems 15a and 15b.

As further depicted in FIG. 1, the network system further includes various e-mail servers 61 and IM servers 65 such as may be provided by respective Internet service provider hosts supporting client systems 15a and 15b. In one embodiment, e-mail server 61 and instant messaging server 65 may participate in executing the messaging activity management of the present invention, enabling client systems, such as clients 15a and 15b to access and invoke the respective e-mail and IM clients as described in further detail below. E-mail servers 61 and IM servers 65 are depicted as single blocks for purposes of illustrative simplicity and clarity and those skilled in the art will appreciate that such network hosted servers may comprise various servers/services supporting respective clients on the network.

Upon receiving login names and passwords from client systems 15a and 15b, e-mail servers 61 log into each of their respective e-mail clients' 19a and 19b hosted e-mail accounts. Upon logging into each of the clients' e-mail accounts, e-mail servers 61 retrieve all e-mail messages received on the accounts and deliver them to the local inboxes of the respective e-mail clients. In an exemplary embodiment, the clients' e-mail accounts are simple mail transfer protocol (SMTP) e-mail accounts. In addition, the e-mail accounts may be post office protocol version 3 (POP3) compatible.

As is well-known in the art, instant messaging differs from traditional e-mail applications in the immediacy and simplicity of the message exchanges. To this end, IM server 65 and IM clients 17a and 17b cooperatively enable local users to conveniently observe whether or not another instant messaging user is presently logged in to the system and, if so, to exchange messages with them. So-called presence data, as set by IM clients 17a and 17b and posted by IM server 65 using a presence service 67, provides notification of client login and/or presently desired accessibility status. Examples of commonly utilized presence status indicia selectable by IM clients include online, offline, busy, away, do not disturb, etc. Given the real-time nature of instant messaging, IM clients 17a and 17b must be logged on at the same time and must have a presence status signaling acceptance of instant messages. An attempt to send an instant message to an offline client or a client having a presence status rejecting incoming messages will result in IM server 65 notifying the sender that the transmission cannot be completed. If the online IM client 17 is set to receive messages (i.e. logged on and receptive presence indicia), the recipient IM client application typically alerts the recipient user of a received message in one of various possible ways (e.g. distinctive sound, message box conveying an instant message has arrived, window containing the received instant message, etc.).

Figure 2:
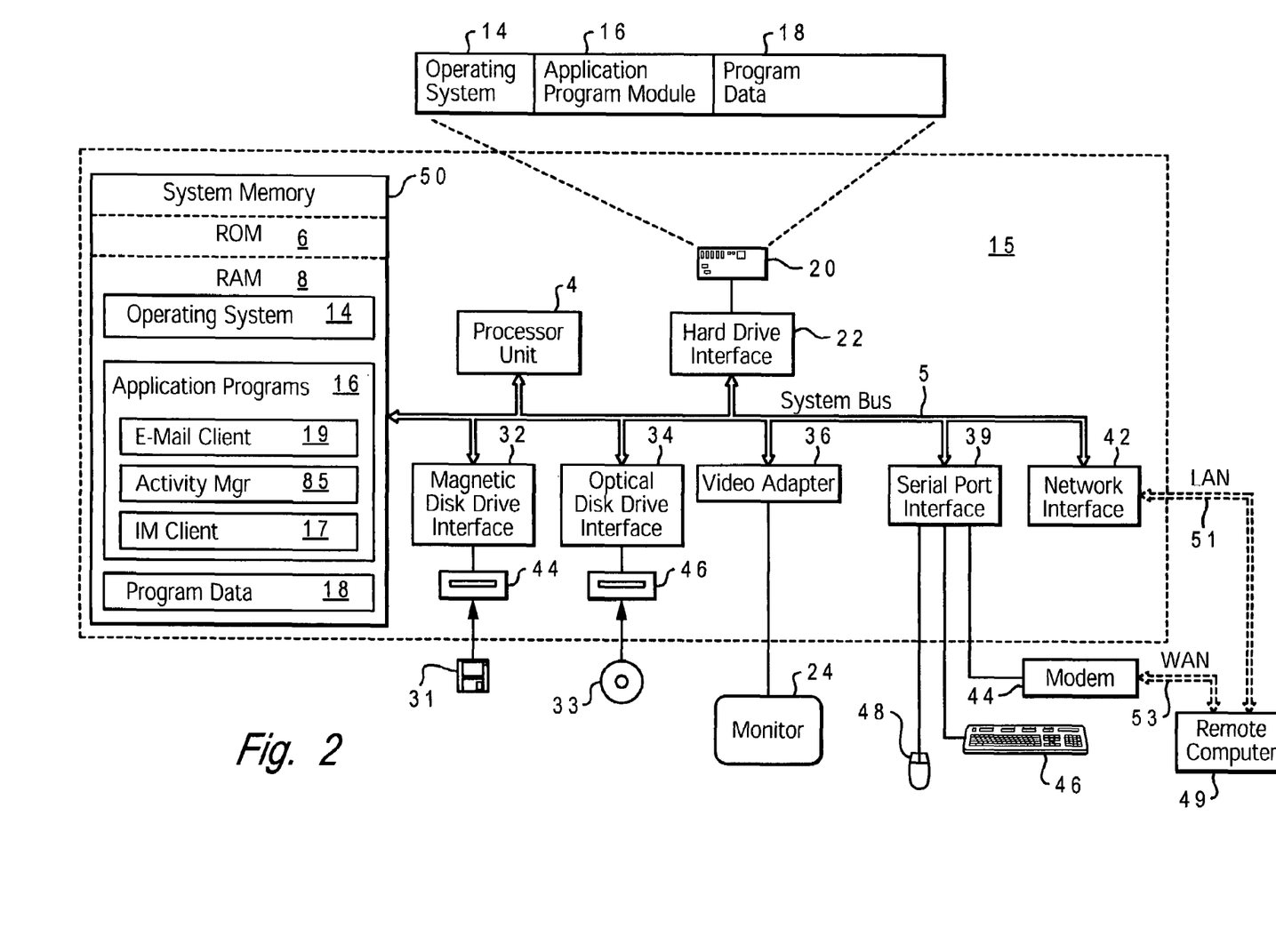
FIG. 2 is a simplified block diagram representation of a data processing system adapted for managing e-mail and real-time messaging activity between clients in accordance with a preferred embodiment of the present invention.

FIG. 2 depicts a client data processing system adapted for implementing the messaging activity management of the present invention. For discussion purposes, the data processing system is described as a personal computer, such as a desktop or portable computer. However, as used herein, the terms "data processing system," "computer," and the like, are intended to mean essentially any type of computing device or machine that is capable of running a software product, including communication devices (e.g., pagers, telephones, electronic books, etc.) and other computer-based networked devices (e.g., handheld computers, Web-enabled televisions, home automation systems, multimedia viewing systems, etc.).

While the invention is described in the general context of an application program that runs on an operating system in conjunction with a personal computer, those skilled in the art will recognize that the invention may also be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like.

The exemplary client data processing system illustrated in FIG. 2 generally comprises a personal computer 15 (representative of either client system 15a or 15b in FIG. 1) having a processor unit 4, a system memory 50, and a system bus 5 that couples system memory 50 to processing unit 4. The system memory 50 includes read only memory (ROM) 6 and random access memory (RAM) 8. Personal computer 15 further includes a hard disk drive 20, a magnetic disk drive 44, e.g., to read from or write to a removable disk 31, and an optical disk drive 46, e.g., for reading a CD-ROM disk 33 or to read from or write to other optical media. Hard disk drive 20, magnetic disk drive 44, and optical disk drive 46 are connected to system bus 5 by a hard disk drive interface 22, a magnetic disk drive interface 32, and an optical drive interface 34, respectively. The drives and their associated computer-readable media provide non-volatile storage for personal computer 15. Although the description of computer-readable media above refers to an on-board hard disk, a removable magnetic disk, and a CD-ROM disk, it should be appreciated by those skilled in the art that other types of media which are readable by a computer, such as magnetic cassettes, flash memory cards, digital video disks, Bernoulli cartridges, and the like, may also be used in the exemplary computer operating environment.

A number of program modules may be stored in the drives and system memory 50, including an operating system 14, application program modules 16, such as Microsoft's OFFICE suite of program modules, and program data 18.

A user may enter commands and information into personal computer 15 through a keyboard 46 and pointing device, such as a mouse 48. Other input devices (not shown) may include a microphone, joystick, game pad, satellite dish, scanner, or the like. These and other input devices are often connected to processing unit 4 through a serial port interface 39 that is coupled to system bus 5, but may be connected by other interfaces, such as a game port or a universal serial bus. A monitor 24 or other type of display device is also connected to system bus 5 via an interface, such as a video adapter 36.

Personal computer 15 may operate in a networked environment using logical connections to one or more remote computers, such as a remote computer 49. The remote computer 49 may be a server, a router, a peer device or other common network node, and typically includes many or all of the elements described relative to personal computer 15. The logical network connections depicted in FIG. 2 include a local area network (LAN) 51 and the WAN 53 depicted in FIG. 1. Such networking environments are commonplace in offices, enterprise-wide computer networks, Intranets and the Internet.

When used in a LAN networking environment, personal computer 15 is connected to LAN 51 through a network interface 42. When used in a WAN networking environment, personal computer 15 typically includes a modem 44 or other means for establishing communications over WAN 53, such as the Internet. Modem 44, which may be internal or external, is connected to system bus 5 via serial port interface 39. In a networked environment, program modules depicted relative to personal computer 15, or portions thereof, may be stored in one or more remote (i.e., network distributed) memory storage devices. It will be appreciated that the network connections shown are exemplary and other means of establishing a communications link between the computers may be used.

In accordance with the depicted embodiment, application programs 16 further includes an e-mail client application 19 (representative of e-mail client 19a or 19b), such a may be included in a web browser application. E-mail client 19 includes program modules and instructions enabling an e-mail client addressee (i.e., an e-mail user having an e-mail address) to send, receive and organize e-mail messages over LAN 51 and/or WAN 53. Also included in application programs 16 is an IM client 17 (representative of IM client 17a or 17b) that providing various clients-side IM functions. In accordance with the present invention, applications programs 16 further includes a messaging activity manager module 85 that performs functions related to managing e-mail and real-time messaging activity between a first client and a second client as explained in further detail below.

Messaging activity manager 85 may be a stand-alone application or may be incorporated in part or whole in either or both e-mail client 19 and IM client 17. As explained in further detail with reference to FIGS. 3-5, activity manager 85 includes processing and/or program instruction means for accessing e-mail message and control data from e-mail client 19 and IM messaging data from IM client 17 to be utilized for switching between e-mail and IM. The present invention utilizes e-mail header information to manage message sequencing (i.e. ordering), filtering and other display characteristics.

Figure 3:
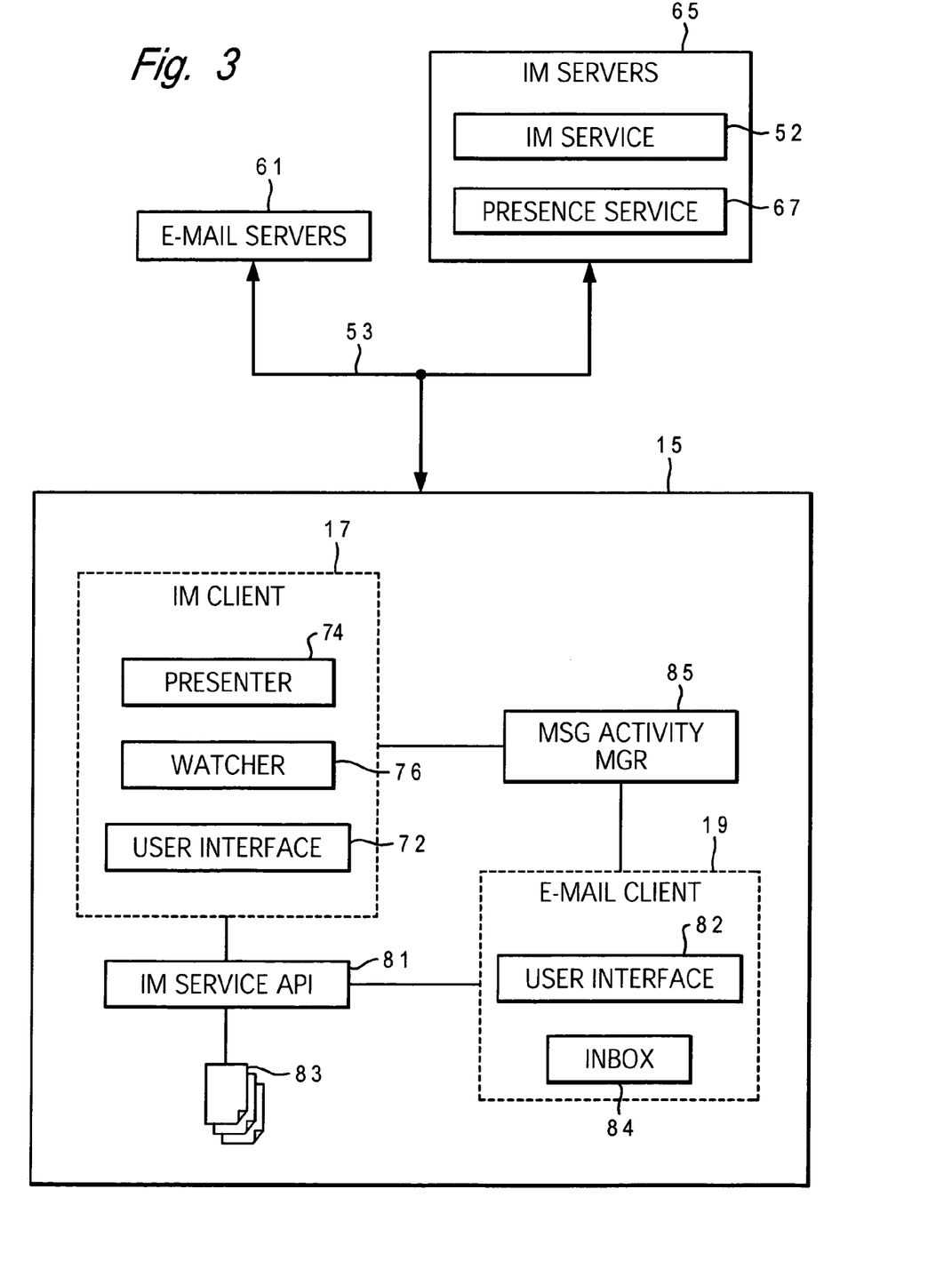
FIG. 3 is a high-level block diagram depicting message activity management components in accordance with a preferred embodiment of the present invention.

Referring to FIG. 3, there is illustrated a high-level block diagram depicting messaging activity management components in accordance with a preferred embodiment of the present invention. As shown in FIG. 3, the e-mail client 19 and IM client 17 applications in personal computer client 15 are network-coupled via WAN 53 to e-mail server 61 and IM server 65. IM server 65 generally comprises an IM service module 52 and a presence service module 67. With respect to IM client 17 and other subscribing IM clients not depicted in FIG. 3, and in accordance with conventional IM standards, presence service module 67 accepts, stores, and distributes information relating to IM clients' accessibility. The information is stored as what is known as "presence information" and is distributed to other clients to provide notification of the present accessibility of a given IM client. To this end, presence service module 67 has two distinct sets of sub-clients— presenters and watchers. A presenter incorporated within IM client 17, depicted as presenter 74 and sometimes referred to as a "presentity," provides presence information relating to the IM online/accessibility status of an IM subscriber using IM client 17.

The other type of sub-client within IM client 17, depicted as watcher 76, receives presence information of other IM subscribers collected by module 67. The watcher sub-client may be further categorized into so-called "fetchers" and "subscribers." A fetcher requests the current presence information value(s) for one or more specified presenters from presence service 67. In contrast, a subscriber requests notification from presence service 67 of future changes in one or more specified presenters' presence information. The list of one or more specified presenter(s) for which the presence information is requested is typically determined by a specified contact or "buddy" that is included in the profile data of watcher 76 within IM client 17. A user interface module 72, which may be any combination of a text box, graphical user interface window, etc., conveys the IM message and presence information provided by IM server 65 to a local user at personal computer 15. As further depicted in FIG. 3, an IM service application program interface 81 is sometimes used to maintain an IM session file 83 (usually a temporarily stored file) that essentially maintains a transcript of a given IM session.

IM service 52 also has two distinct sets of sub-clients for each client such as IM client 17—senders and instant inboxes. A sender sub-client provides instant messages to the IM service 52 for delivery. Each instant message is addressed to a particular instant message inbox, and IM service 52 attempts to deliver the message to a corresponding instant inbox in the corresponding recipient IM subscriber's inbox.

E-mail client 19 generally comprises processing and/or program means utilized for reading, writing, storing, and sending e-mail messages. A user interface 82 provides the local user with various input/output tools consisting of, for example, a simple text editor, GUI-based data organization tools, etc. E-mail client 19 also includes an inbox 84 for receiving e-mail messages retrieved from e-mail server 61.

E-mail server 61 is an application that receives e-mail messages from e-mail clients, such as e-mail client 19, or other mail servers. While not expressly depicted in the figures, e-mail server 61 generally comprises a data storage area, a list of subscribers, sets of subscriber-defined rules and various communications modules. The storage area is typically a database storing messages and subscriber-related control data.

As further illustrated in FIG. 3, client personal computer 15 further includes electronic processing and/or program instruction means in the form of an activity manager module 85 for managing e-mail and real-time messaging activity between clients. While depicted as a single, discrete block in FIG. 3, it should be noted that the functionality of activity manager 85 as described herein may be distributed among one or more of e-mail client 19 and/or IM client 17. Activity manager 85 may also be distributed among two or more client data processing systems, such as across client systems 15a and 15b depicted in FIG. 1.

Activity manager 85 may be executed as a standalone application that is installed or downloaded on a client system such as personal computer 15, or may be incorporated into an existing messaging application or similar commercially-available product as an enhancement feature. In an alternate embodiment, the features of activity manager 85 may be provided via a third party application service provider or other electronic commerce service broker in which such services are provided for a contract or per-use fee.

Figure 4:
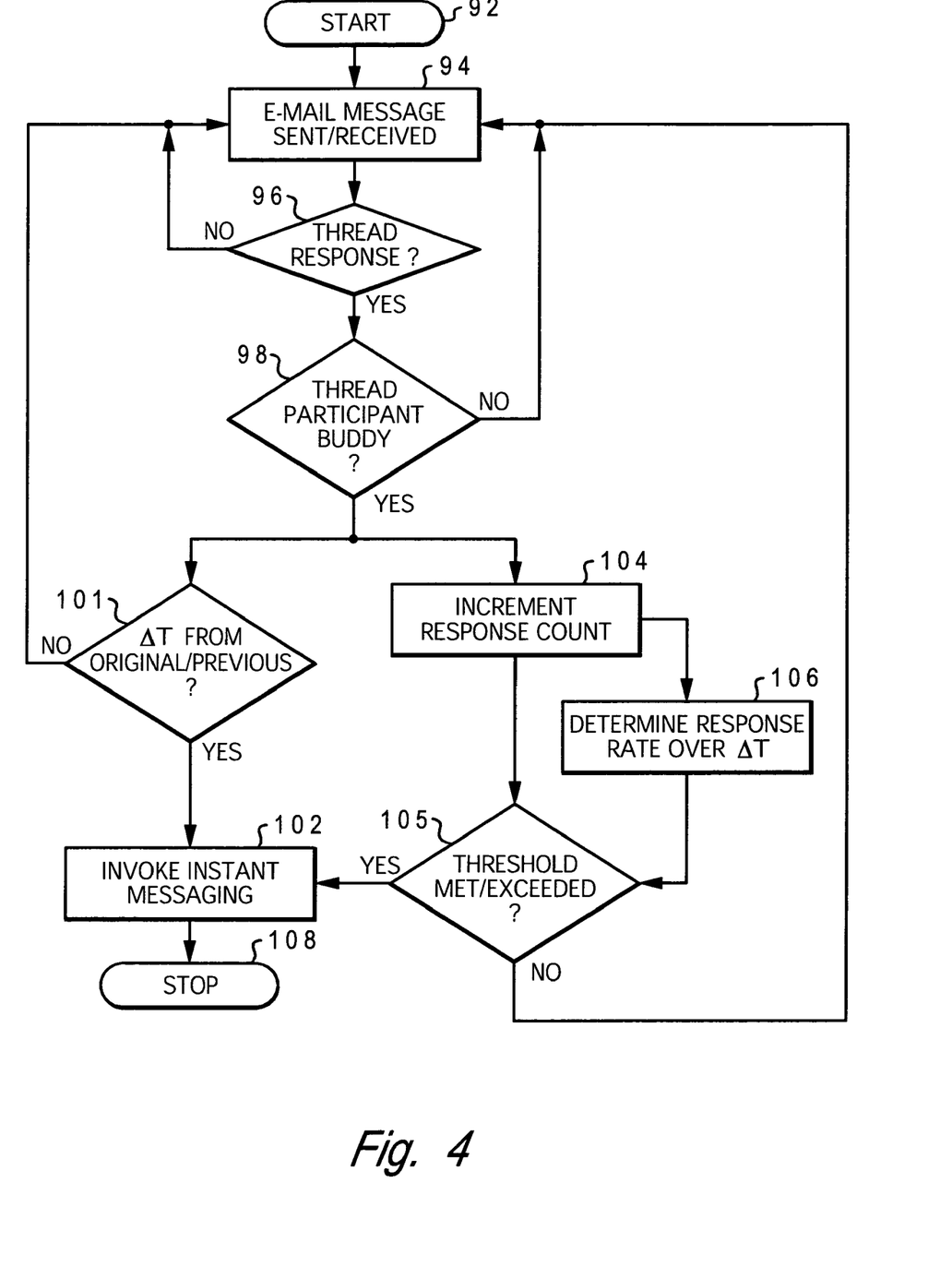
FIG. 4 is a high-level flow diagram illustrating steps for managing e-mail and real-time messaging activity between clients in accordance with one embodiment of the present invention.

Referring now to FIG. 4 in conjunction with FIGS. 1-3, and assuming each of client systems 15a and 15b include the client components contained in personal computer client 15, there is depicted a high-level flow diagram illustrating steps for managing e-mail and real-time messaging activity between clients in accordance with one embodiment of the present invention. The process begins as shown at steps 92 and 94 with an e-mail message being delivered between client systems 15a and 15b. Given the various possible configurations, the e-mail delivery depicted at step 94 may be detected or otherwise determined in terms of a sent or a received e-mail.

The process continues with activity manager 85 determining whether or not the delivered e-mail message is an e-mail thread response (step 96). As utilized herein, an e-mail thread is essentially an e-mail "conversation" among two or more e-mail clients facilitated by well-known e-mail client tools that enable an e-mail recipient to utilize portions of the content or control information of the received message to respond in some manner. Typical of such options are a "reply to sender" option, a "reply to all" option, a "forward" option, etc. One advantageous feature of such e-mail functions is shared by the "reply" options which provide the message recipient with a convenient reply GUI in which some or all of the e-mail address content included in the received message is conveniently pre-loaded into the "send to" address field, thus relieving the recipient/replier from having to manually enter the address information. A more significant advantageous feature shared by the "forward" option as well as the "reply" options is that the message content of the original sender's message can automatically or optionally be included and appended onto the reply message drafted by the message recipient to be sent to one or more subsequent recipients.

Responsive to an e-mail thread response detected at step 96, activity manager 85 further determines whether or not the thread participant (addressee to which or from which the e-mail is addressed) is included on the client station's IM contact list (commonly referred to as a "buddy list") as shown at step 98. In response to the remote e-mail thread participant (i.e. client from which response generated or to which response delivered) being included in the IM contact list (typically included as a client name having an associated e-mail address in watcher 76) within IM client 17, the messaging activity management procedure utilizes the status of the received thread response to prompt an instant messaging session in accordance with one of several related criteria.

In one embodiment, and as depicted at steps 101 and 102, activity manager 85 determines a period between the detected e-mail thread response and a previous e-mail message included in the same thread. In response to the period between the previous message and current response exceeding a specified threshold period $\Delta t$, an instant messaging session is invoked between two or more of the thread participants. Activity manager 85 may determine the inter-thread response period by monitoring traffic into and/or out of e-mail client inbox 84. Specifically, the e-mail message header information for the respective messages can be used to determine both the status of the received e-mail as a "thread response" and also to determine the period between messages as determined by timestamps included in the respective message headers.

In an alternate embodiment, the number of thread responses sent and/or delivered relating to the same original message serves as the impetus for invoking instant messaging. Specifically, activity manager 85 responds to detecting each e-mail thread response message by incrementing a counter as shown at step 104. Once the counter value has reached or exceed a specified threshold number of thread responses, instant messaging is invoked (steps 105 and 102).

In an alternative embodiment, message activity manager 85 utilizes the frequency over time of e-mail thread responses to an original e-mail messaging as the criterion for invoking instant messaging. Specifically, and as depicted at steps 104, 106, 105, and 102, the counter value is tracked over a specified and possibly repeating time interval $\Delta T$ to determine a rate of response which is then compared with a specified threshold to determine whether or not to invoke instant messaging client 17.

The invocation of instant messaging depicted at step 102 may be performed in one of several ways. In one embodiment, activity manager 85 prompts IM client 17 to generate a user text dialog box or equivalent utility from user interface 72 to visually prompt the user to initiate an IM session login. In an alternate embodiment, activity manager 85 prompts IM client 17 to autonomically login a particular IM client or subscriber using pre-stored login/password data and consequently deliver the client's presence data to the network IM server application via presenter 74. While not expressly depicted in the figures herein, and in the case in which IM client 17, e-mail client 19, and activity manager 85 are application programs running under an operating system, the invocation of IM client preferably comprises processing an application program interface call from the operating system to IM client 17. The messaging activity management process depicted in FIG. 4 terminates as shown at step 108.

In a preferred embodiment of the present invention, activating an instant messaging session between first and second IM clients includes storing instant messaging session correspondence in a session file 83 (see FIG. 3) within one or both of the clients. Furthermore, the content of the e-mail thread is associated with the consequently generated IM session file.

Figure 5:
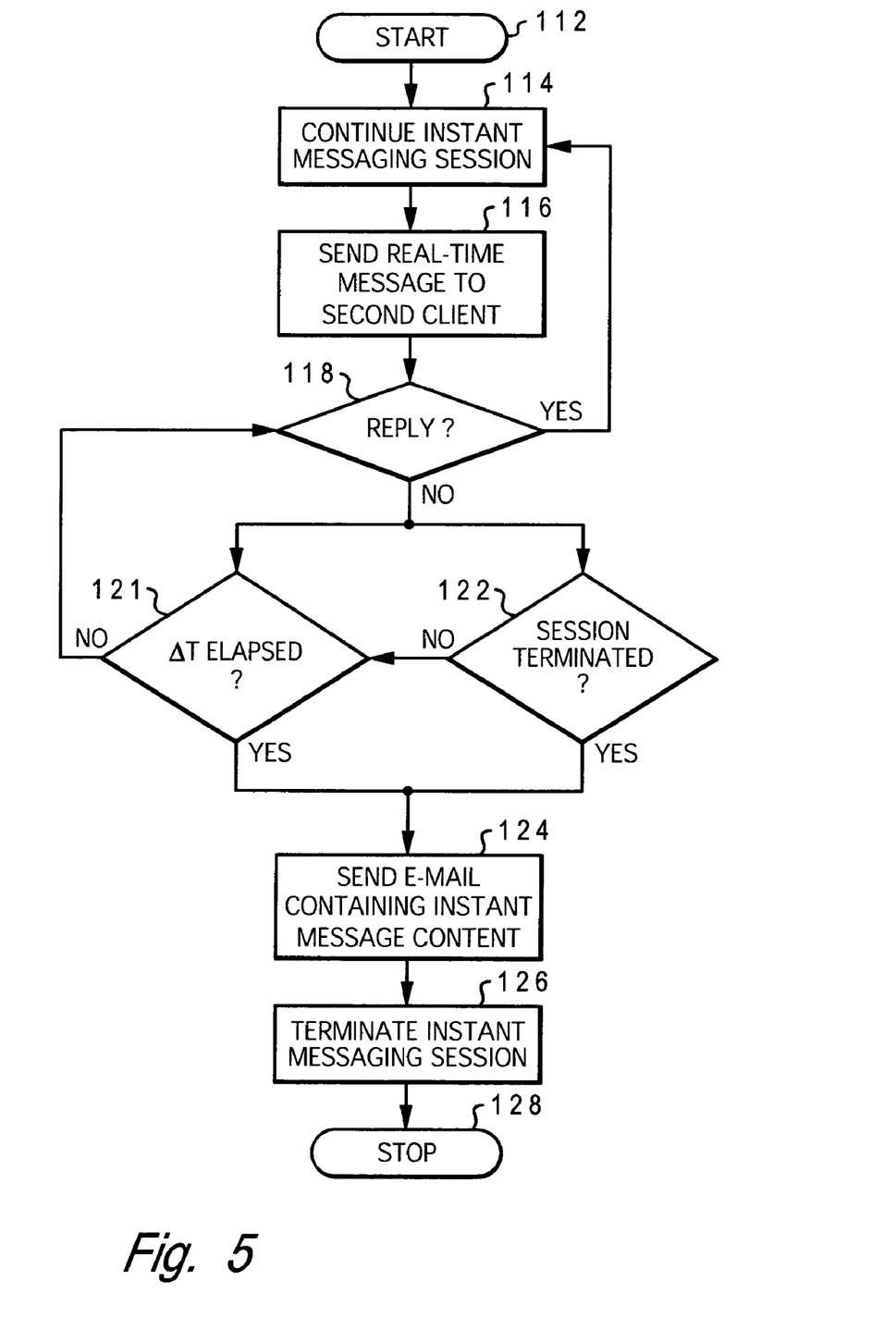
FIG. 5 is a high-level flow diagram depicting steps for managing e-mail and real-time messaging activity between clients in accordance with an alternate embodiment of the present invention.

FIG. 5 is a high-level flow diagram depicting steps for managing e-mail and real-time messaging activity between clients in accordance with an alternate embodiment of the present invention. The process begins as shown at steps 112 and 114 with message processing undertaken during an ongoing IM session. Proceeding to step 116, and as part of the IM session, a first IM client, such as IM client 17a, delivers an instant message to a second IM client, such as IM client 17b. Next, as illustrated at steps 118 and 114 if a reply is detected at the "sender" (i.e. IM client 17a in this example), the IM session continues in a conventional manner with the exchange of substantially real-time messages.

In accordance with the alternate embodiment depicted in FIG. 5, messaging activity manager 85 monitors the messaging traffic between the IM participants, and in response to a last-to-receive client (i.e. recipient client) failing to send a reply or response message to the sender over a specified period $\Delta T$, the e-mail client corresponding to the last-to-send (i.e. sender) IM client (e.g. e-mail client 19a corresponding to IM client 17a) delivers an e-mail message containing at least a portion of the message content contained in the last instant message delivered. In this manner, the sender is provided greater assurance that the unacknowledged last sent instant message has been sent and stored in the e-mail inbox of the recipient, thus assuring the recipient will receive the message. Referring back to FIG. 3 in conjunction with FIG. 5, the triggering event occurring at steps 121 or 122, is detected by message activity manager 85 which instructs e-mail client 19 to access an IM session file 83 to collect some or all of the session data from IM session file 83 to be included in the e-mail.

In an alternate embodiment, a session termination detected as shown at step 122, would automatically invoke sending the e-mail message containing the non-replied-to instant message. Following delivery of the e-mail containing the instant message content, the process terminates as illustrated at steps 126 and 128.

The disclosed methods may be readily implemented in software using object or object-oriented software development environments that provide portable source code that can be used on a variety of computer or workstation hardware platforms. Whether software or hardware is used to implement the systems in accordance with this invention is dependent on the speed and/or efficiency requirements of the system, the particular function, and the particular software or hardware systems or microprocessor or microcomputer systems being utilized. The computer controlled display systems and methods described above, however, can be readily implemented in hardware and/or software using any known or later-developed systems or structures, devices and/or software by those skilled in the applicable art without undue experimentation from the functional description provided herein together with a general knowledge of the computer arts.

Moreover, the disclosed methods may be readily implemented as software executed on a programmed general purpose computer, a special purpose computer, a microprocessor, or the like. In this instance, the methods and systems of this invention can be implemented as a routine embedded on a personal computer such as a Java or CGI script, as a resource residing on a server or graphics workstation, as a routine embedded in a dedicated electronic message management system, a web browser, an electronic message enabled cellular phone, a PDA, a dedicated computer controlled display system, or the like. The computer controlled display system can also be implemented by physically incorporating the system and method into a software and/or hardware system, such as the hardware and software systems of a dedicated computer controlled display system.

While the invention has been particularly shown and described with reference to a preferred embodiment, it will be understood by those skilled in the art that various changes in form and detail may be made therein without departing from the spirit and scope of the invention. These alternate implementations all fall within the scope of the invention.

What is claimed is:

1. A method for use in a data processing system for managing e-mail and real-time messaging activity between a first client and a second client, said method comprising:

automatically detecting an $n^{th}$ e-mail thread response to an original e-mail message delivered between said first client and said second client, wherein n is greater than or equal to one, wherein said $n^{th}$ e-mail thread response is a sequence of one or more e-mail reply responses exchanged between a first e-mail client within said first client or a second e-mail client within said second client;

associating header information of one or more e-mail messages to identify the $n^{th}$ e-mail thread response, wherein the $n^{th}$ e-mail thread response is one or more of a sent and a received e-mail message;

detecting n e-mail thread responses to the original e-mail message over a specified period;

monitoring a timestamp of the $n^{th}$ e-mail thread response, wherein the timestamp of the $n^{th}$ e-mail thread response determines a period between the previous e-mail message and the current e-mail reply;

enabling a counter when the original e-mail message is transmitted, said counter tracking the number of $n^{th}$ e-mail thread responses until the counter reaches a predefined number;

incrementing the counter when a new $n^{th}$ e-mail thread response is received;

determining a predefined threshold period of time between transmission of a previous e-mail message and receipt of a current e-mail reply;

determining a rate of response of one or more $n^{th}$ e-mail thread responses;

responsive to said automatically detecting the $n^{th}$ e-mail thread response within a response time less than the predefined threshold period of time and when a value of the counter reaches the predefined number of $n^{th}$ e-mail thread responses, automatically invoking a real-time electronic messaging session between said first client and said second client; and responsive to the rate of response attaining one or more of a predefined threshold rate of response of the $n^{th}$ e-mail thread responses, automatically invoking a real-time messaging client application on at least one of said first client and said second client.

2. The method of claim 1, wherein said data processing system includes an operating system that manages execution of an e-mail client and a real-time electronic messaging client, said automatically invoking a real-time electronic messaging session comprising processing an application program interface call from said operating system to said real-time electronic messaging client.

3. The method of claim 1, wherein said automatically invoking a real-time electronic messaging session between said first client and said second client comprises:

automatically activating an instant messaging session between said first client and said second client, said automatically activating an instant messaging session includes storing instant messaging session correspondence in an instant message session file within one or more of said first client and said second client;

dynamically associating the content of the original e-mail message and one or more e-mail thread responses with said session file, wherein content from the original e-mail message and one or more e-mail thread responses, are contained within said instant message session file.

4. The method of claim 1, wherein said detecting an $n^{th}$ e-mail thread response comprises detecting n e-mails within an e-mail thread, wherein the e-mail thread is one or more of the original e-mail message and e-mail thread responses.

5. The method of claim 4, said detecting n e-mails within an e-mail thread comprises:

within said first client or said second client:

detecting a total number of reply messages in association with said e-mail thread; and comparing the detected total number of reply messages to a specified threshold, wherein the threshold is less than or equal to n.

6. A computer-readable storage medium having encoded thereon computer-executable instructions for managing e-mail and real-time messaging activity between a first client and a second client, said computer-executable instructions performing a method comprising:

automatically detecting an $n^{th}$ e-mail thread response to an original e-mail message delivered between said first client and said second client, wherein n is greater than or equal to one, wherein said $n^{th}$ e-mail thread response is a sequence of one or more e-mail reply responses exchanged between a first e-mail client within said first client or a second e-mail client within said second client;

associating header information of one or more e-mail messages to identify the $n^{th}$ e-mail thread response, wherein the $n^{th}$ e-mail thread response is one or more of a sent and a received e-mail message;

detecting n e-mail thread responses to the original e-mail message over a specified period;

monitoring a timestamp of the $n^{th}$ e-mail thread response, wherein the timestamp of the $n^{th}$ e-mail thread response determines the period between the previous e-mail message and the current e-mail reply;

enabling a counter when the original e-mail message is transmitted, said counter tracking the number of $n^{th}$ e-mail thread responses until the counter reaches a predefined number;

incrementing the counter when a new $n^{th}$ e-mail thread response is received;

determining a predefined threshold period of time between transmission of a previous e-mail message and receipt of a current e-mail reply;

determining a rate of response of one or more $n^{th}$ e-mail thread responses;

responsive to said automatically detecting the $n^{th}$ e-mail thread response within a response time less than the predefined threshold period of time and when a value of the counter reaches the predefined number of $n^{th}$ e-mail thread responses, automatically invoking a real-time electronic messaging session between said first client and said second client; and responsive to the rate of response attaining one or more of a predefined threshold rate of response of the $n^{th}$ e-mail thread responses, automatically invoking a real-time messaging client application on at least one of said first client and said second client.

7. The computer-readable storage medium of claim 6, wherein said data processing system includes an operating system that manages execution of an e-mail client and a real-time electronic messaging client, said automatically invoking a real-time electronic messaging session comprising processing an application program interface call from said operating system to said real-time electronic messaging client.

8. The computer-readable storage medium of claim 6, wherein said dynamically invoking a real-time electronic messaging session between said first client and said second client comprises:

automatically activating an instant messaging session between said first client and said second client, said automatically activating an instant messaging session includes storing instant messaging session correspondence in an instant message session file within one or more of said first client and said second client;

dynamically associating the content of the original e-mail message and one or more e-mail thread responses with said session file, wherein content from the original e-mail message and one or more e-mail thread responses, are contained within said instant message session file.

9. The computer-readable storage medium of claim 6, wherein said detecting n e-mails within an e-mail thread, wherein the e-mail thread is one or more of the original e-mail message and e-mail thread responses.

10. The computer-readable storage medium of claim 9, said detecting n e-mails within an e-mail thread comprises within said first client or said second client:
- detecting a total number of reply messages in association with said e-mail thread; and
- comparing the detected total number of reply messages to a specified threshold, wherein the threshold is less than or equal to n.

11. A method for use in a data processing system for managing e-mail and real-time messaging activity between a first client and a second client, said method comprising:
- sending a real-time message, within a first client, to a second client during a real-time messaging session between said first client and said second client;
- detecting a real-time messaging session;
- determining a response real-time message has not been received by one or more of a first client and second client in a predefined amount of time following a transmission of the real-time message to one of the first client or second client;
- detecting a period from a time mark from which said first client sent said real-time message to said second client;
- tracking the period from the time mark to a time when a message is detected from one of said first client or said second client, wherein when a message is not received from one of said first client or said second client, within said pre-defined amount of time, automatically generating and sending an e-mail message;
- detecting a real-time messaging session termination event within said first client when one or more of said first client and said second client fail to deliver a return real-time message to said second client during the real-time messaging session during the predefined amount of time; and
- automatically generating and sending an e-mail message containing said content of a previously sent real-time message to one or more of said first client and said second client in response to a real-time messaging session termination event.

12. The method of claim 11, wherein said real-time messaging session termination event comprises said first client or said second client terminating said real-time messaging session, wherein terminating occurs when said first or said second client fail to detect the response message within the predefined amount of time.

13. The method of claim 11, wherein said real-time messaging session is an instant messaging session between said first client and said second client, and wherein said first client generates a session file containing a record of the instant messaging correspondence between said first client and said second client, said method further comprising automatically associating the contents of said session file with said delivered e-mail message when said real-time messaging session is terminated.

14. A computer-readable storage medium having encoded thereon computer-executable instructions for managing e-mail and real-time messaging activity between a first client and a second client, said computer-executable instructions performing a method comprising within a first client:
- sending a real-time message, within a first client, to a second client during a real-time messaging session between said first client and said second client;
- detecting a real-time messaging session;
- determining a response real-time message has not been received by one or more of a first client and second client in a predefined amount of time following a transmission of the real-time message to one of the first client or second client;
- detecting a period from a time mark from which said first client sent said real-time message to said second client;
- tracking the period from the time mark to a time when a message is detected from one of said first client or said second client, wherein when a message is not received from one of said first client or said second client, within said pre-defined amount of time, automatically generating and sending an e-mail message;
- detecting a real-time messaging session termination event within said first client when one or more of said first client and said second client fail to deliver a return real-time message to said second client during the real-time messaging session during the predefined amount of time; and
- automatically generating and sending an e-mail message containing said content of a previously sent real-time message to one or more of said first client and said second client in response to a real-time messaging session termination event.

15. The computer-readable storage medium of claim 14, wherein said real-time messaging session termination event comprises one or more of said first client and said second client failing to deliver the return real-time message to said second client during said real-time messaging session during the predefined amount of time.

16. The computer-readable storage medium of claim 15, further comprising detecting said real-time messaging session termination event within said first client.

17. The computer-readable storage medium of claim 14, wherein said real-time messaging session is an instant messaging session between said first client and said second client, and wherein said first client generates a session file containing a record of the instant messaging correspondence between said first client and said second client, said method further comprising automatically associating the contents of said session file with said delivered e-mail message when said real-time messaging session is terminated.

* * * * *